(12) United States Patent
Enamito et al.

(10) Patent No.: US 10,620,169 B2
(45) Date of Patent: Apr. 14, 2020

(54) ACOUSTIC INSPECTION APPARATUS, AUDIO SIGNAL ACQUISITION APPARATUS, ACOUSTIC INSPECTION SYSTEM, AND ACOUSTIC INSPECTION METHOD

(71) Applicant: KABUSHIKI KAISHA TOSHIBA, Tokyo (JP)

(72) Inventors: Akihiko Enamito, Kawasaki Kanagawa (JP); Osamu Nishimura, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 168 days.

(21) Appl. No.: 15/897,863

(22) Filed: Feb. 15, 2018

(65) Prior Publication Data

US 2019/0017973 A1 Jan. 17, 2019

(30) Foreign Application Priority Data

Jul. 11, 2017 (JP) .................. 2017-135732

(51) Int. Cl.
*G01N 29/44* (2006.01)
*G01N 29/04* (2006.01)
(Continued)

(52) U.S. Cl.
CPC ....... *G01N 29/4463* (2013.01); *G01N 29/045* (2013.01); *G01N 29/11* (2013.01);
(Continued)

(58) Field of Classification Search
CPC .. G01N 29/4463; G01N 29/045; G01N 29/11; G01N 29/48; G01N 29/46
See application file for complete search history.

(56) References Cited

U.S. PATENT DOCUMENTS

| 4,163,393 A | 8/1979 | Gutierrez et al. |
| 4,212,205 A * | 7/1980 | West ............... G01N 29/045 |
| | | 73/52 |

(Continued)

FOREIGN PATENT DOCUMENTS

| JP | 04-316198 | 11/1992 |
| JP | 05-169529 | 7/1993 |

(Continued)

OTHER PUBLICATIONS

English Translation of JP 2003-240764.*

*Primary Examiner* — Helen C Kwok
(74) *Attorney, Agent, or Firm* — Finnegan, Henderson, Farabow, Garrett & Dunner, L.L.P.

(57) ABSTRACT

An acoustic inspection apparatus includes an acoustic-intensity calculating unit, a noise calculating unit, a noise removing unit and an inspecting unit. The acoustic-intensity calculating unit calculates an acoustic intensity, in which an acoustic intensity caused by hammering on an inspection target at a hammering position is canceled out, based on audio signals acquired by microphones in a symmetrical arrangement of at least one pair of microphone positions with respect to the hammering position or in a symmetrical arrangement of two hammering positions with respect to a pair of microphone positions. The noise calculating unit calculates a noise component from the calculated acoustic intensity. The noise removing unit removes the noise component from a physical quantity based on at least one of audio signals acquired at the at least one pair of microphone positions. The inspecting unit performs inspection on the hammering position based on the physical quantity.

6 Claims, 12 Drawing Sheets

(51) Int. Cl.
　　*G01N 29/11*　　(2006.01)
　　*G01N 29/48*　　(2006.01)
　　*G10L 21/0232*　(2013.01)
　　*H04R 1/40*　　(2006.01)
　　*H04R 29/00*　　(2006.01)
　　*G01N 29/14*　　(2006.01)

(52) U.S. Cl.
　　CPC ............ *G01N 29/14* (2013.01); *G01N 29/48* (2013.01); *G10L 21/0232* (2013.01); *H04R 1/406* (2013.01); *H04R 29/00* (2013.01); *G01N 2291/015* (2013.01)

(56) References Cited

U.S. PATENT DOCUMENTS

| | | | | |
|---|---|---|---|---|
| 4,429,575 | A * | 2/1984 | Akishika | G01N 29/045 73/584 |
| 4,522,063 | A * | 6/1985 | Ver Nooy | G01M 7/00 73/579 |
| 4,918,988 | A * | 4/1990 | Ebihara | G01M 7/08 73/12.09 |
| 6,026,686 | A * | 2/2000 | Hattori | G01N 29/045 702/56 |
| 6,880,403 | B1 * | 4/2005 | Shimada | G01M 7/00 73/600 |
| 7,059,191 | B2 * | 6/2006 | Gupta | G01N 29/14 73/587 |
| 10,186,253 | B2 * | 1/2019 | Horiuchi | G10L 15/02 |
| 2005/0114081 | A1 * | 5/2005 | Fukui | G01N 29/14 702/182 |
| 2008/0144927 | A1 * | 6/2008 | Hashimoto | G01N 29/045 382/156 |
| 2014/0260527 | A1 | 9/2014 | Mazzeo et al. | |
| 2014/0283609 | A1 * | 9/2014 | Macleod | G01N 3/06 73/587 |
| 2016/0225389 | A1 * | 8/2016 | Jinnai | G10L 25/84 |
| 2017/0343516 | A1 * | 11/2017 | Matsunaga | G01N 29/04 |

FOREIGN PATENT DOCUMENTS

| | | |
|---|---|---|
| JP | 09-105667 | 4/1997 |
| JP | 2000-131196 | 5/2000 |
| JP | 2003-240764 * | 8/2003 |
| JP | 2006-337102 | 12/2006 |

* cited by examiner

ACOUSTIC INSPECTION APPARATUS, AUDIO SIGNAL ACQUISITION APPARATUS, ACOUSTIC INSPECTION SYSTEM, AND ACOUSTIC INSPECTION METHOD

CROSS-REFERENCE TO RELATED APPLICATIONS

This application is based upon and claims the benefit of priority from Japanese Patent Application No. 2017-135732, filed on Jul. 11, 2017; the entire contents of which are incorporated herein by reference.

FIELD

Embodiments described herein relate generally to an acoustic inspection apparatus, an audio signal acquisition apparatus, an acoustic inspection system, and an acoustic inspection method.

BACKGROUND

Conventionally, there is known an acoustic inspection apparatus that performs inspection by analyzing a sound generated by hammering.

It is beneficial to obtain a further improved acoustic inspection apparatus that can, for example, reduce the influence of noise.

DETAILED DESCRIPTION

An acoustic inspection apparatus includes an acoustic-intensity calculating unit, a noise calculating unit, a noise removing unit and an inspecting unit. The acoustic-intensity calculating unit calculates an acoustic intensity, in which an acoustic intensity caused by hammering on an inspection target at a hammering position is canceled out, based on audio signals acquired by microphones in a symmetrical arrangement of at least one pair of microphone positions with respect to the hammering position or in a symmetrical arrangement of two hammering positions with respect to a pair of microphone positions. The noise calculating unit calculates a noise component from the calculated acoustic intensity. The noise removing unit removes the noise component from a physical quantity based on at least one of audio signals acquired at the at least one pair of microphone positions. The inspecting unit performs inspection on the hammering position based on the physical quantity.

Exemplary embodiments of the present invention will be disclosed below. Configurations and control (technical characteristics) of the embodiments described below, and operations and results (effects) due to the configurations and control are only examples. Same constituent elements are included in the embodiments and modifications exemplified below. In the following descriptions, same constituent elements are denoted by common reference signs, and redundant explanations thereof are omitted.

Further, each of the drawings includes an arrow indicating a direction. An axial direction of a central axis Ax (FIG. 1) of an inspection target (hereinafter, simply referred to as "axial direction") is indicated with an arrow X, an outward direction along a radial direction of the central axis Ax (hereinafter, simply referred to as "radial direction") is indicated with an arrow Ro, and a circumferential direction of the central axis Ax (hereinafter, simply referred to as "circumferential direction") is indicated with an arrow C.

First Embodiment

Figure 1:
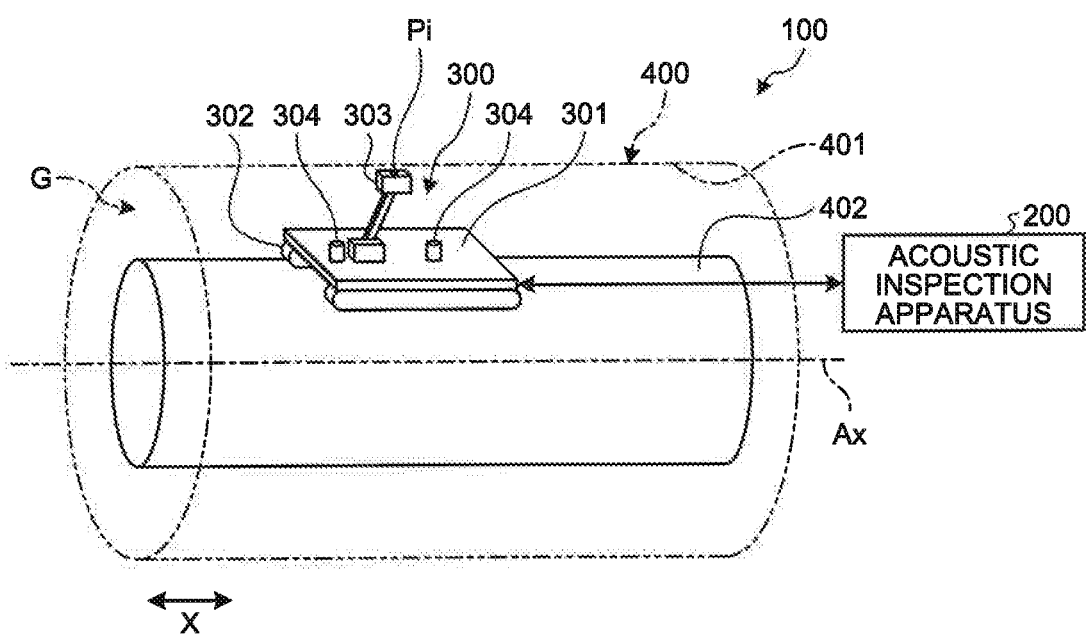
FIG. 1 is a perspective view schematically and exemplarily illustrating an acoustic inspection system according to an embodiment.

FIG. 1 is a perspective view of an acoustic inspection system 100. The acoustic inspection system 100 includes an acoustic inspection apparatus 200 and an audio signal acquisition apparatus 300. The audio signal acquisition apparatus 300 is remotely controlled by the acoustic inspection apparatus 200 to move on a surface 402 opposed to an inspection target surface 401 of an inspection target 400 by a moving mechanism 302, to hammer on a hammering position Pi (an inspection target position) on the inspection target surface 401 by a hammering mechanism 303, to acquire the sound generated by the hammering by a plurality of microphones 304, and to transmit acquired audio signals to the acoustic inspection apparatus 200 in a wired or wireless manner. The acoustic inspection apparatus 200 analyzes the acquired audio signals to perform inspection on the hammering position Pi. The acoustic inspection apparatus 200 may be integrated with the audio signal acquisition apparatus 300.

In the acoustic inspection system 100 exemplified in FIG. 1, the audio signal acquisition apparatus 300 is, for example, a robot that can move in an annular gap G extending in the axial direction and can hammer on a plurality of (arbitrary) hammering positions Pi on the inspection target surface 401 in accordance with positional control by the acoustic inspection apparatus 200. The annular gap G is a gap between the inspection target surface 401 that is a substantially cylindrical inner surface, and the opposed surface 402 that is a substantially cylindrical outer surface concentric with the inspection target surface 401. The inspection target surface 401 of the inspection target 400 is, for example, inner surfaces of a plurality of members, which are so-called "wedges", arranged along an inner surface of a rotor of a turbine generator in its axial direction and its circumferential direction. However, the inspection target 400 and the inspection target surface 401 are not limited thereto.

The moving mechanism 302, the hammering mechanism 303, and the microphones 304 are provided on a base 301. The shape of the base 301 is in the form of a quadrilateral plate, for example, but the shape is not limited thereto. The moving mechanism 302 includes a motor, a deceleration mechanism, a caterpillar track, and wheels, for example. It is preferable that the moving mechanism 302 and the audio signal acquisition apparatus 300 do not come into contact with the inspection target surface 401 except for a hammer of the hammering mechanism 303, in order not to hinder vibrations of the inspection target surface 401.

In the acoustic inspection system 100, an analysis is performed based on the audio signals acquired by the microphones 304. Therefore, it is not preferable that noise (disturbance of sonic waves) other than the audio signals based on hammering is mixed into the audio signals acquired by the microphones 304. The inventors of the present application have found from thorough studies a novel configuration and a novel method that can remove the noise by using an acoustic intensity.

Figure 2:
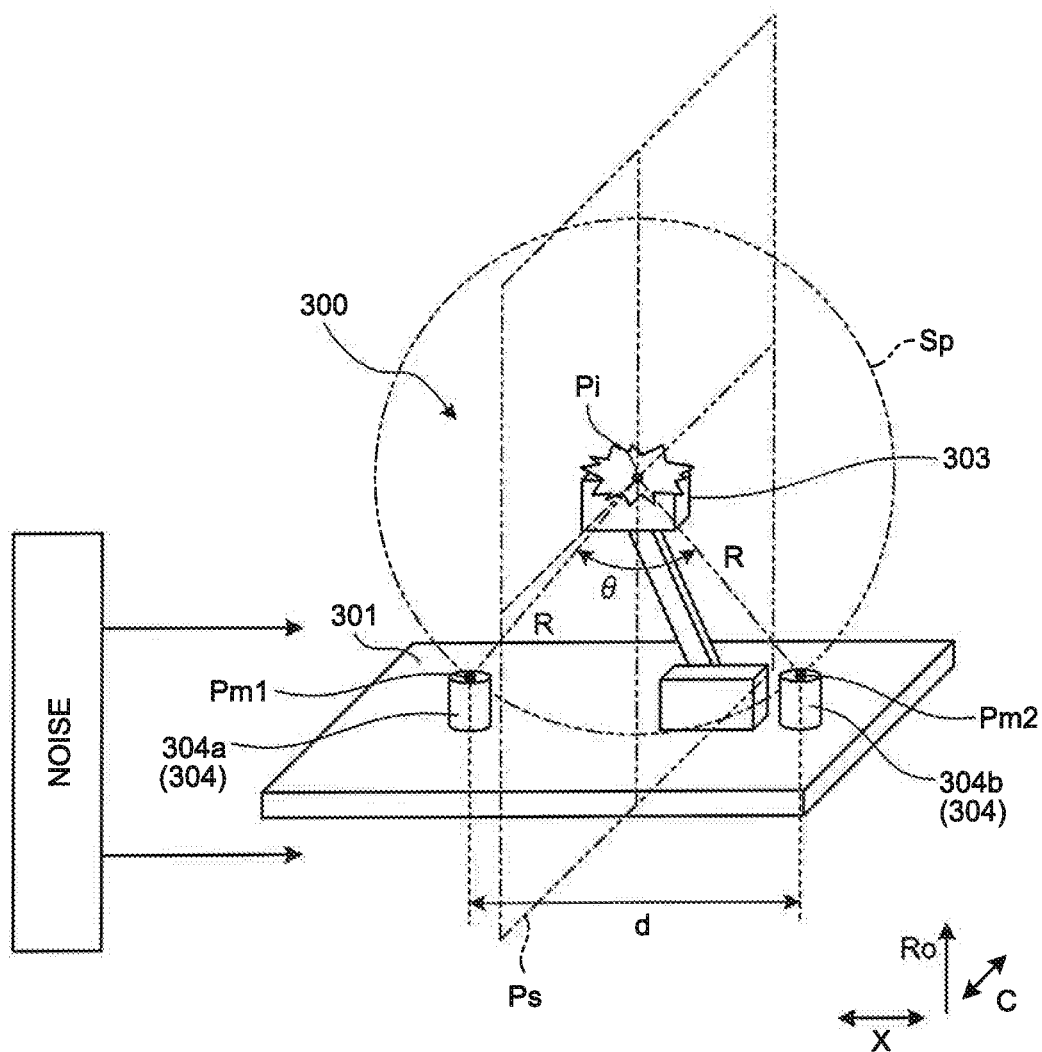
FIG. 2 is an explanatory view schematically and exemplarily illustrating the principle of inspection by an acoustic inspection system according to a first embodiment.

FIG. 2 is an explanatory view of the principle of inspection by the acoustic inspection system 100. The sound generated by hammering on the hammering position Pi (vibrations of a medium) propagates through the medium in the gap G to reach the microphones 304. In a case where two microphones 304a and 304b are provided on the sides of the hammering position Pi opposite to each other and are equidistantly arranged to be away from the hammering position Pi by a distance R, a vector of an audio signal from the hammering position Pi toward an audio-acquisition position Pm1 and a vector of an audio signal from the hammering position Pi toward an audio-acquisition position Pm2 include components of opposite directions to each other. Therefore, in a state where there is no obstacle or the like between the hammering position Pi and the audio-acquisition positions Pm1 and Pm2 at which the two microphones 304a and 304b acquire the audio signals and resonance, reflection, or the like of the sound hardly occurs, components based on hammering on the hammering position Pi are canceled out in an acoustic intensity of the audio signals acquired at the two audio-acquisition positions Pm1 and Pm2. Here, the acoustic intensity is defined as energy per second of sound passing through a unit area perpendicular to a traveling direction of the sound at one point in a sound field, that is, acoustic power per unit area, and can be calculated by the following Expression (1).

$$I = \frac{1}{T}\int_0^T p(t) \cdot u(t) \, dt \tag{1}$$

Here, I is an acoustic intensity, p is a sound pressure, u is a particle speed, t is a time, and T is an integration time.

The acoustic intensity can be calculated by a known method such as a direct method or a cross-spectral method. In a first embodiment, a calculation by the cross-spectral method is performed as represented by Expression (2), for example, in order to enable analysis for each frequency component to be performed.

$$I_r = \frac{1}{2\pi\rho d}\int_{f_1}^{f_2} \frac{Im[G_{12}(f)]}{f} \, df \tag{2}$$

Here, $I_r$ is an acoustic intensity in a direction connecting two microphones, p is a medium density, d is a distance between the audio-acquisition positions Pm1 and Pm2, $G_{12}(f)$ is a cross-spectral sealing function of the sound pressure at the audio-acquisition positions Pm1 and Pm2, and f is a frequency.

Meanwhile, as illustrated in FIG. 1, in an environment where the annular gap G extending in the axial direction is formed, the noise from outside propagates along the axial direction. Therefore, the components based on the noise are not canceled out in the acoustic intensity of the audio signals acquired at the two audio-acquisition positions Pm1 and Pm2. Therefore, in the present embodiment, the acoustic inspection apparatus 200 calculates the acoustic intensity based on the audio signals that are generated by hammering on the hammering position Pi and are acquired at the two audio-acquisition positions Pm1 and Pm2 arranged at positions that are symmetrical with each other with respect to a virtual reference surface Ps passing through the hammering position Pi. In the acoustic intensity calculated in this manner, components generated by hammering on the hammering position Pi are canceled out, and the components based on the noise are mainly contained. Therefore, the acoustic inspection apparatus 200 calculates a noise component based on the acoustic intensity, and reduces the noise component from a physical quantity based on the audio signal of at least one of the two audio-acquisition positions Pm1 and Pm2. The audio-acquisition position Pm1 is an example of a first microphone position, and the audio-acquisition position Pm2 is an example of a second microphone position.

Figure 3:
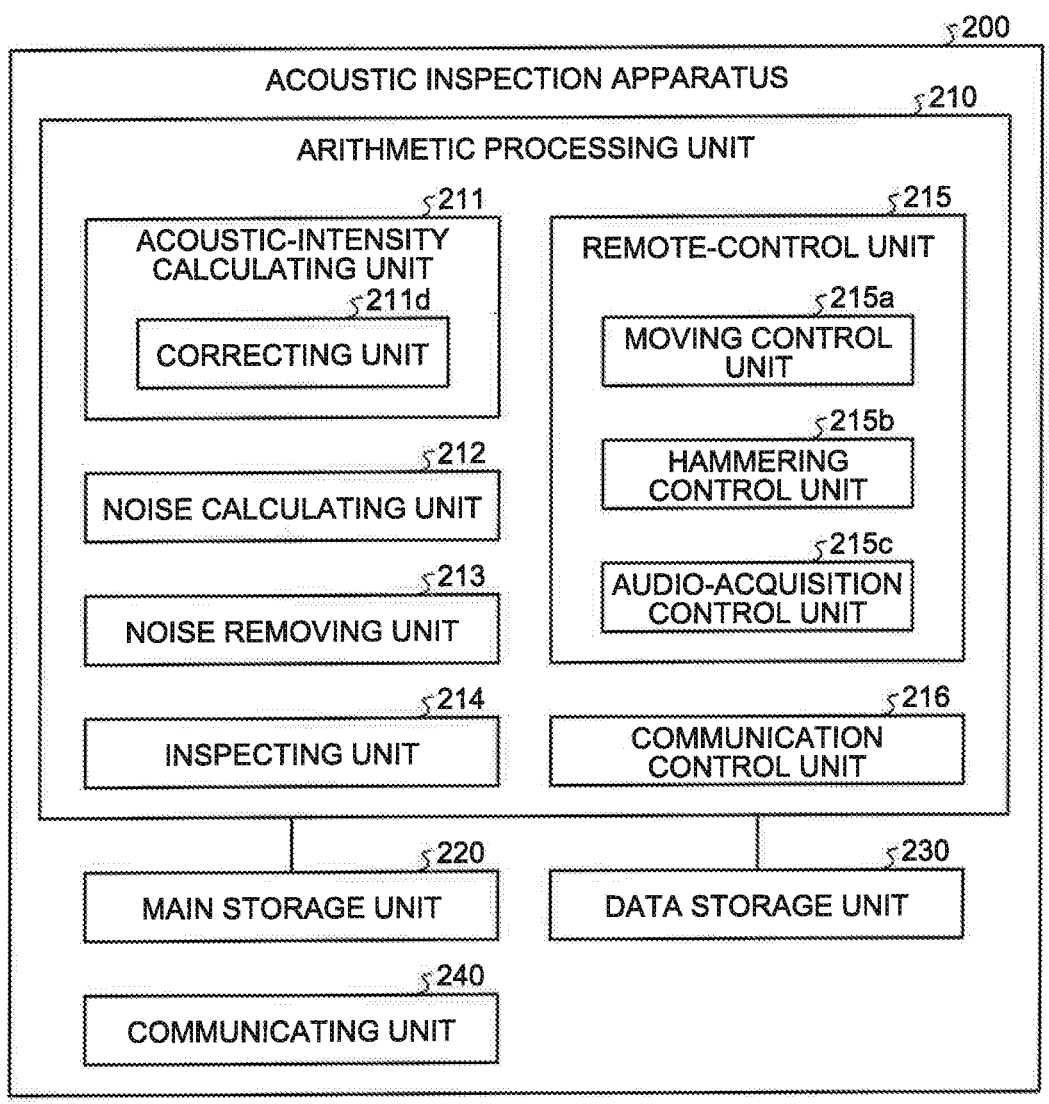
FIG. 3 is a block diagram schematically and exemplarily illustrating the acoustic inspection apparatus according to the first embodiment.

FIG. 3 is a block diagram of the acoustic inspection apparatus 200. The acoustic inspection apparatus 200 includes an arithmetic processing unit 210, a main storage unit 220, a data storage unit 230, and a communicating unit 240. The arithmetic processing unit 210 includes an acoustic-intensity calculating unit 211, a noise calculating unit 212, a noise removing unit 213, an inspecting unit 214, a remote-control unit 215, and a communication control unit 216. The acoustic inspection apparatus 200 is a computer, for example.

The arithmetic processing unit 210 is a central processing unit (CPU) or a controller, for example, the main storage unit 220 is a read only memory (ROM) or a random access memory (RAM), for example, the data storage unit 230 is a hard disk drive (HDD), a solid state drive (SSD), or a flash memory, for example, and the data storage unit 230 can be called "an auxiliary storage unit".

Arithmetic processing and control by the arithmetic processing unit 210 can be performed by software or by hardware. The arithmetic processing and control by the arithmetic processing unit 210 can include arithmetic processing and control by software and arithmetic processing and control by hardware. In a case of processing by software, the arithmetic processing unit 210 reads out and executes a program stored in a ROM, an HDD, an SSD, a flash memory, or the like. As the arithmetic processing unit 210 is operated in accordance with the program, it functions as the acoustic-intensity calculating unit 211, the noise calculating unit 212, the noise removing unit 213, the inspecting unit 214, the remote-control unit 215, and the communication control unit 216. In this case, the program includes modules respectively corresponding to elements such as the acoustic-intensity calculating unit 211, the noise calculating unit 212, the noise removing unit 213, the inspecting unit 214, and the remote-control unit 215 and the like. The program can be provided as a file in an installable format or an executable format, while being recorded in a computer-readable recording medium such as a CD-ROM, an FD, a CD-R, or a DVD.

The program can be introduced by being stored in a storage unit of a computer connected to a communication network and being downloaded through the network. Further, the program can be incorporated in a ROM or the like in advance.

In a case where the entirety or a part of the arithmetic processing unit 210 is constituted by hardware, the arithmetic processing unit 210 can include a field programmable gate array (FPGA), an application specific integrated circuit (ASIC), and the like.

The acoustic-intensity calculating unit 211 calculates an acoustic intensity based on audio signals respectively acquired at the two audio-acquisition positions Pm1 and Pm2.

Further, the acoustic-intensity calculating unit 211 includes a correcting unit 211d. The correcting unit 211d sets a frequency component of the calculated acoustic intensity, which is lower than a threshold (first threshold), to zero. As a result, it is possible to remove a remaining component, which has not been canceled out in the acoustic intensity because of low symmetry of the two audio-acquisition positions Pm1 and Pm2 with respect to the hammering position Pi, in the component generated by hammering on the hammering position Pi, for example.

The noise calculating unit 212 calculates a noise component from the acoustic intensity calculated by the acoustic-intensity calculating unit 211 and corrected by the correcting unit 211d. In this example, the noise component is, for example, an imaginary part of a cross spectrum calculated based on an acoustic intensity or a cross-spectral density.

The noise removing unit 213 reduces the noise component from a physical quantity based on the audio signal of at least one of the two audio-acquisition positions Pm1 and Pm2. In this case, for example, the physical quantity based on the audio signal of at least one of the two audio-acquisition positions Pm1 and Pm2 is a power spectrum or a power spectral density of the audio signal at the audio-acquisition position Pm1, a power spectrum or a power spectral density of the audio signal at the audio-acquisition position Pm2, a cross spectrum of the audio signals at the audio-acquisition positions Pm1 and Pm2, or a cross spectral density of the audio signals at the audio-acquisition positions Pm1 and Pm2.

The inspecting unit 214 performs, with a known analysis method, an inspection on the inspection target surface 401 at the hammering position Pi from a physical quantity from which the noise has been removed by the noise removing unit 213. Specifically, the inspecting unit 214 performs a comparison with a power spectrum that has been acquired in a normal state in advance, for example, and in a case where there is a frequency component whose ratio to a frequency component in the normal state exceeds a threshold, the inspecting unit 214 can determine that the hammering position Pi is abnormal.

The remote-control unit 215 includes elements such as a moving control unit 215a, a hammering control unit 215b, and an audio-acquisition control unit 215c. The moving control unit 215a controls operations (moving and stopping) of the moving mechanism 302 of the audio signal acquisition apparatus 300, the hammering control unit 215b controls operations (hammering) of the hammering mechanism 303, and the audio-acquisition control unit 215c controls operations (sound acquisition) of the microphone 304.

The communication control unit 216 controls the communicating unit 240 in such a manner that a control signal from the remote-control signal 215 is transmitted to the audio signal acquisition apparatus 300. The communication control unit 216 also controls the communicating unit 240 so as to receive the audio signal acquired by the audio signal acquisition apparatus 300.

For example, the data storage unit 230 can temporarily hold an audio signal and store therein reference data used in inspection in the inspecting unit 214.

Figure 4:
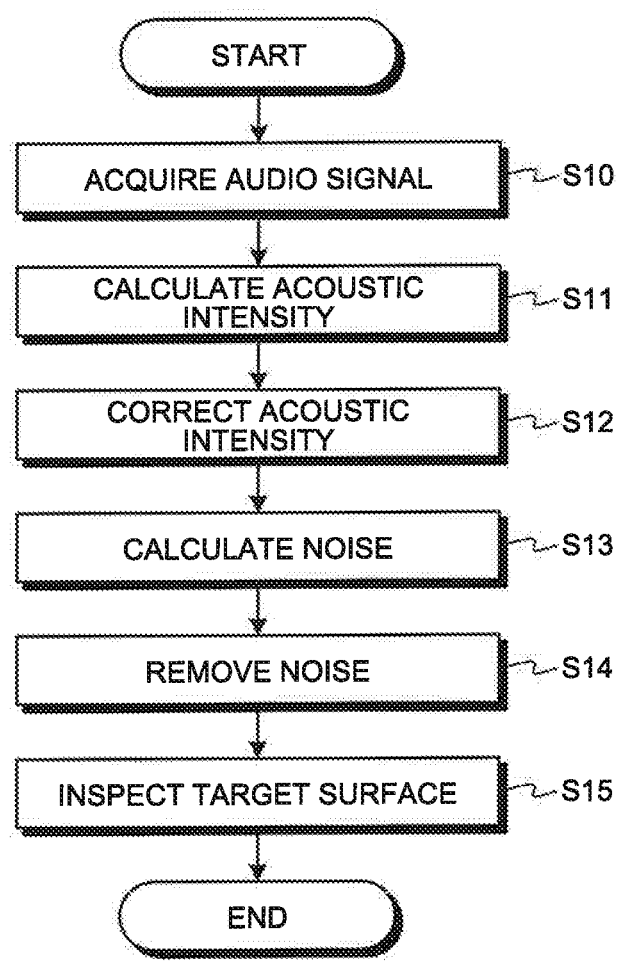
FIG. 4 is a flowchart illustrating an example of a procedure of a series of processes by the acoustic inspection apparatus according to the first embodiment.

FIG. 4 is a flowchart illustrating an example of a procedure of a series of processes by the acoustic inspection apparatus 200. The acoustic-intensity calculating unit 211 acquires audio signals acquired by the microphones 304 via the communicating unit 240 (S10). The acoustic-intensity calculating unit 211 calculates an acoustic intensity from the acquired audio signals (S11), and further corrects the acoustic intensity (S12). Subsequently, the noise calculating unit 212 calculates a noise component from the corrected acoustic intensity (S13). The noise removing unit 213 reduces the noise component from a physical quantity based on the audio signal of at least one of the two audio-acquisition positions Pm1 and Pm2 (314). The inspecting unit 214 performs inspection on the inspection target surface 401 (the inspection target 400) at the hammering position Pi based on the physical quantity from which the noise component has been reduced, by applying a known analysis method (S15).

Figure 5:
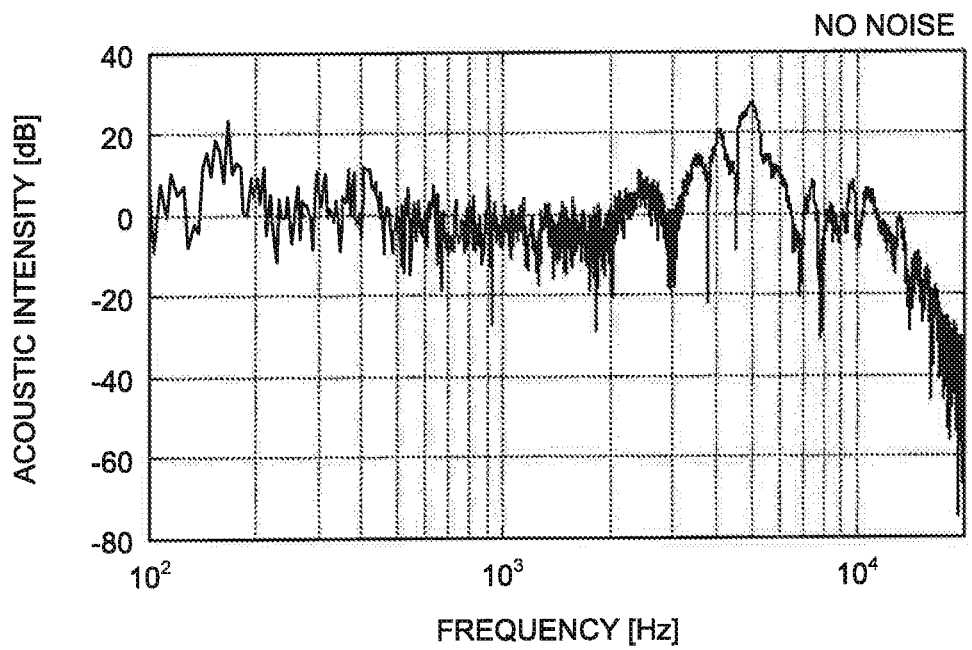
FIG. 5 is a graph illustrating an acoustic intensity obtained by the acoustic inspection system according to the first embodiment when there is no noise.
Figure 6:
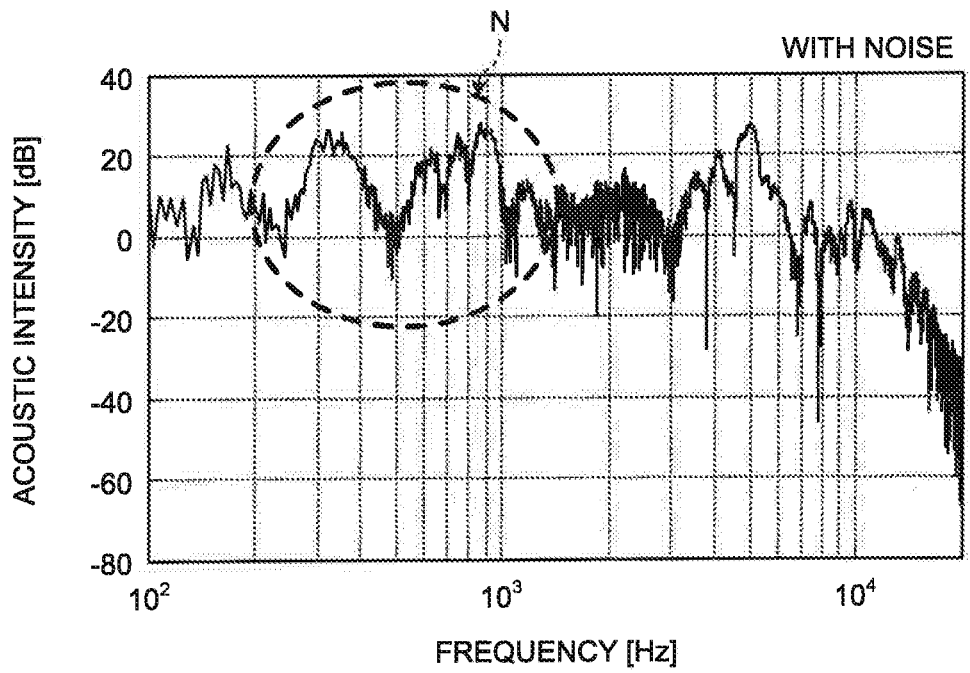
FIG. 6 is a graph illustrating an acoustic intensity obtained by the acoustic inspection system according to the first embodiment when there is a noise.
Figure 7:
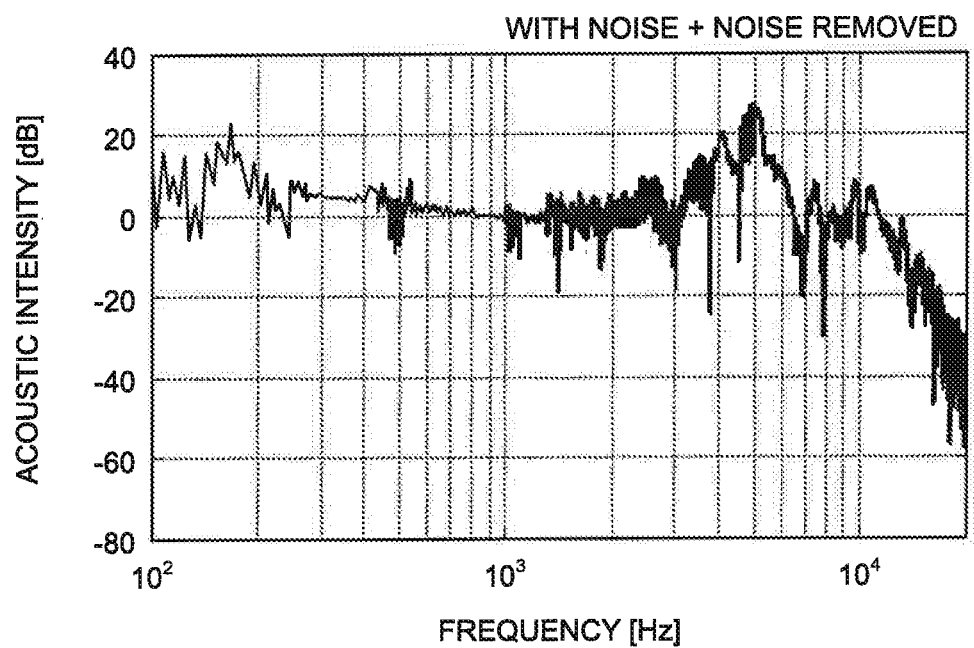
FIG. 7 is a graph illustrating an acoustic intensity obtained by the acoustic inspection system according to the first embodiment in a case where the noise has been removed when there is the noise.

FIGS. 5 to 7 are graphs illustrating examples of an experimental result of an acoustic intensity obtained by the acoustic inspection system 100, where FIG. 5 illustrates an acoustic intensity acquired when there is no noise, FIG. 6 illustrates an acoustic intensity when there is a noise, and FIG. 7 illustrates an acoustic intensity in a case where the noise has been removed by the acoustic inspection system 100 according to the present embodiment when there is the noise.

As is apparent from the comparison between FIGS. 5 and 6, the acoustic intensity in a region surrounded by a broken line N in FIG. 6 is larger than the acoustic intensity in FIG. 5. Therefore, it can be estimated that the increase of the frequency component in this region surrounded by the broken line N is caused by the noise. As is apparent from the comparison between FIGS. 6 and 7, according to the acoustic inspection system 100 of the present embodiment, it is possible to reduce the frequency component in the region surrounded by the broken line N in FIG. 6 and make the acoustic intensity when there is the noise close to the acoustic intensity when there is no noise illustrated in FIG. 5.

In order to obtain a noise component from an acoustic intensity by the method of the present embodiment, as described above, it suffices that the two audio-acquisition positions Pm1 and Pm2 are arranged at positions that are symmetrical with each other with respect to the virtual reference surface Ps passing through the hammering position Pi. In other words, in a case where one audio-acquisition position Pm1 is arranged to be away from the hammering position Pi by a distance F in a first direction, it suffices that the other audio-acquisition position Pm2 is arranged to be away from the hammering position Pi by the distance R in a second direction different from the first direction. Further, in other words, it suffices that the two audio-acquisition positions Pm1 and Pm2 are arranged at positions away from each other on a spherical surface Sp that is centered on the hammering position Pi and has a radius R. The hammering position Pi and the two audio-acquisition positions Pm1 and Pm2 illustrated in FIG. 2 satisfy this arrangement condition (hereinafter, "arrangement condition 1"). In the example of FIG. 2, one direction along the axial direction is an example of the first direction, and the other direction along the axial direction is an example of the second direction. Further, as a solid angle θ between radii from the hammering position Pi as the center to the audio-acquisition positions Pm1 and Pm2 is closer to 180°, the effect of canceling out the acoustic intensity caused by hammering on the hammering position Pi is higher.

In the example of FIG. 2, the audio-acquisition position Pm1, the hammering position Pi, and the audio-acquisition position Pm2 are arranged in the axial direction. Further, the audio-acquisition positions Pm1 and Pm2 are arranged on a surface of the base 301, and the hammering position Pi is arranged to be away from the surface of the base 301.

Figure 8:
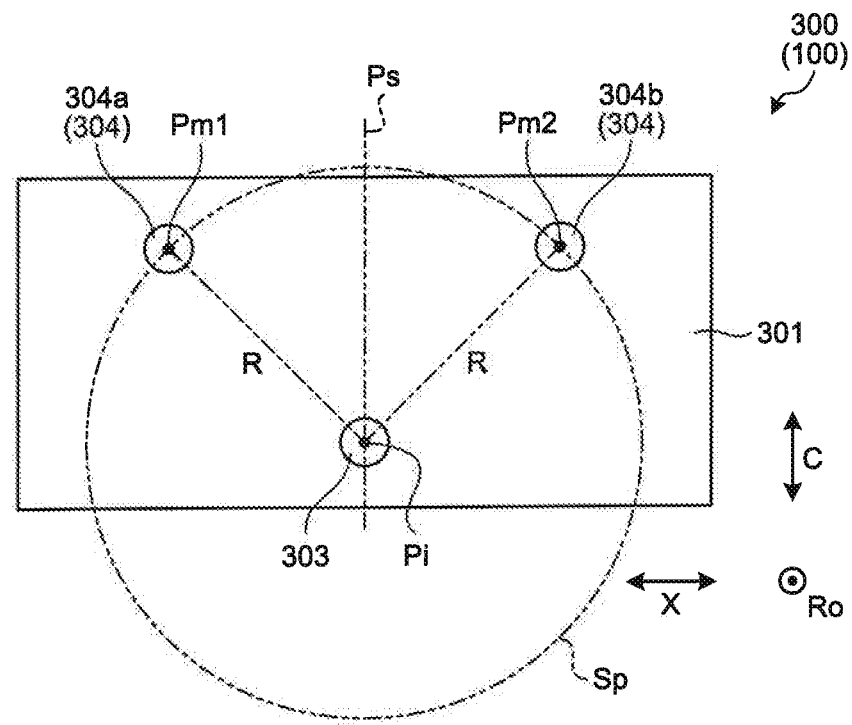
FIG. 8 is a plane view schematically illustrating an example of a layout of a hammering position and a microphone position in the acoustic inspection system according to the first embodiment.
Figure 9:
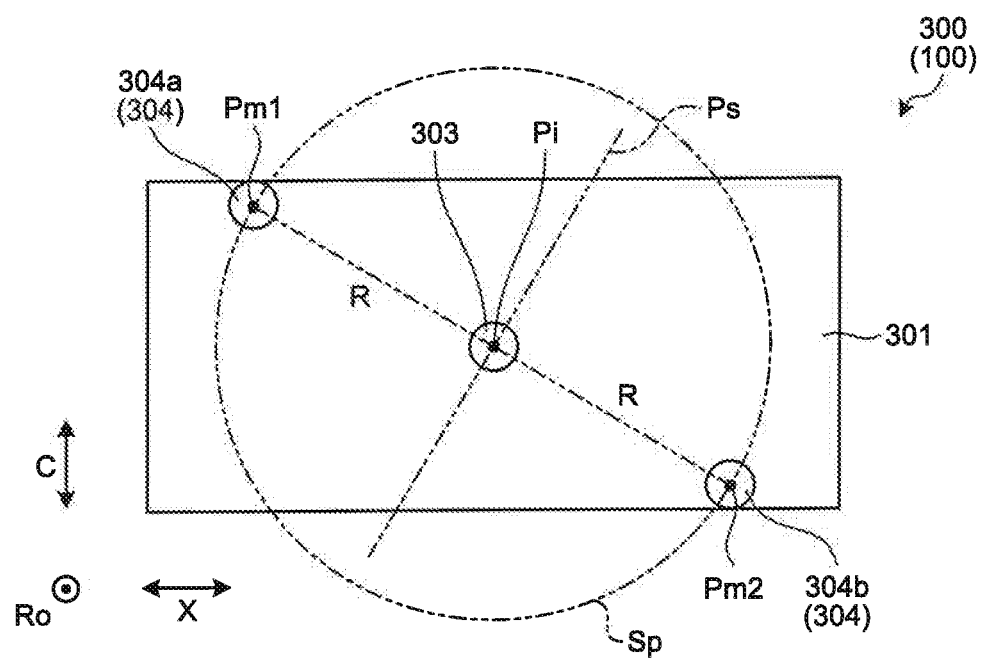
FIG. 9 is a plane view schematically illustrating an example a layout of a hammering position and a microphone position in the acoustic inspection system according to the first embodiment, which is different from that of FIG. 8.
Figure 10:
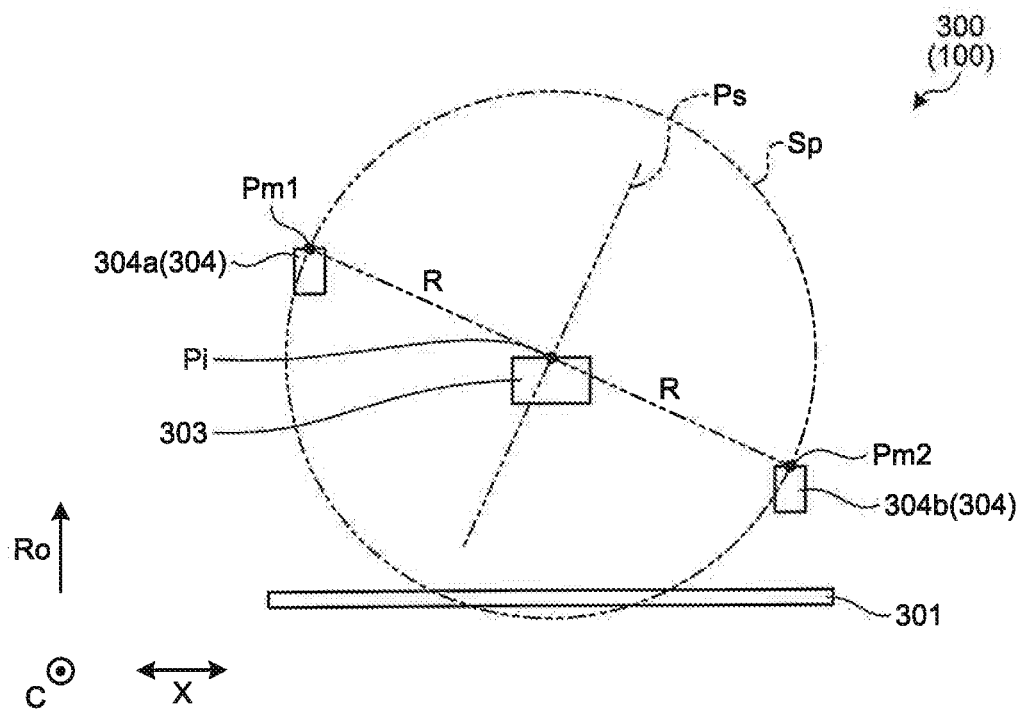
FIG. 10 is a side view schematically illustrating an example a layout of a hammering position and a microphone position in the acoustic inspection system according to the first embodiment, which is different from those of FIGS. 8 and 9.

FIGS. 8 to 10 are diagrams illustrating modifications of the layout of the hammering position Pi and the audio-acquisition positions Pm1 and Pm2, where FIGS. 8 and 9 are plane views when these positions are viewed from outside in the radial direction, and FIG. 10 is a side view when these positions are viewed from the circumferential direction (tangential direction). All the hammering position Pi and the two audio-acquisition positions Pm1 and Pm2 illustrated in FIGS. 8 to 10 satisfy the arrangement condition 1.

In the example of FIG. 8, the audio-acquisition position Pm1 and the audio-acquisition position Pm2 are arranged along the axial direction when viewed from the outside in the radial direction. The two audio-acquisition positions Pm1 and Pm2 are arranged to be shifted from the hammering position Pi in the circumferential direction. Although not illustrated in the drawings, for example, the audio-acquisition positions Pm1 and Pm2 are arranged on a surface of the base 301, and the hammering position Pi is away from the surface of the base 301; however, these positions are not limited thereto.

In the example of FIG. 9, the audio-acquisition position Pm1, the hammering position Pi, and the audio-acquisition position Pm2 are arranged along a direction obliquely crossing the axial direction when viewed from the outside in the radial direction. Although not illustrated in the drawings, for example, the audio-acquisition positions Pm1 and Pm2 are arranged on a surface of the base 301 and the hammering position Pi is away from the surface of the base 301; however, these positions are not limited thereto.

In the example of FIG. 10, the audio-acquisition position Pm1, the hammering position Pi, and the audio-acquisition position Pm2 are arranged along a direction obliquely crossing the axial direction when viewed from the circumferential direction (tangential direction). Although not illustrated in the drawings, for example, the two audio-acquisition positions Pm1 and Pm2 are arranged to be shifted from the hammering position Pi in the circumferential direction; however, these positions are not limited thereto. It suffices that the arrangement of the hammering position P. and the two audio-acquisition positions Pm1 and Pm2 satisfies the arrangement condition 1, and is not limited to the examples of FIGS. 2 and 8 to 10.

As described above, according to the present embodiment, the acoustic inspection apparatus 200 uses the fact that components generated by hammering on the hammering position Pi are canceled out in an acoustic-intensity based on audio signals acquired at the two audio-acquisition positions Pm1 and Pm2 (the first microphone position and the second microphone position) that are symmetrical with each other with respect to the hammering position Pi, calculates a noise component from the acoustic intensity, and reduces the noise component from a physical quantity based on the audio signal of at least one of the two audio-acquisition positions Pm1 and Pm2. Therefore, according to the present embodiment, for example, it is possible to reduce the influence of noise in inspection by analyzing a sound generated by hammering, so that the accuracy of the inspection can be further improved.

Further, in the present embodiment, the audio-acquisition position Pm1 is arranged to be away from the hammering position Pi by a distance R in the first direction, and the audio-acquisition position Pm2 is arranged to be away from the hammering position Pi by the distance R in the second direction different from the first direction. Due to this arrangement, it is possible to cancel out the components generated by hammering on the hammering position Pi in the acoustic intensity based on the audio signals acquired at the two audio-acquisition positions Pm1 and Pm2.

Furthermore, in the present embodiment, the correcting unit 211*d* sets a frequency component of the acoustic intensity based on the audio signals acquired at the two audio-acquisition positions Pm1 and Pm2, which is lower than a threshold, to zero. Accordingly, for example, it is possible to remove a remaining component, which has not been canceled out in the acoustic intensity because of low symmetry of the two audio-acquisition positions Pm1 and Pm2 with respect to the hammering position Pi, in the component generated by hammering on the hammering position Pi.

Second Embodiment

Figure 11:
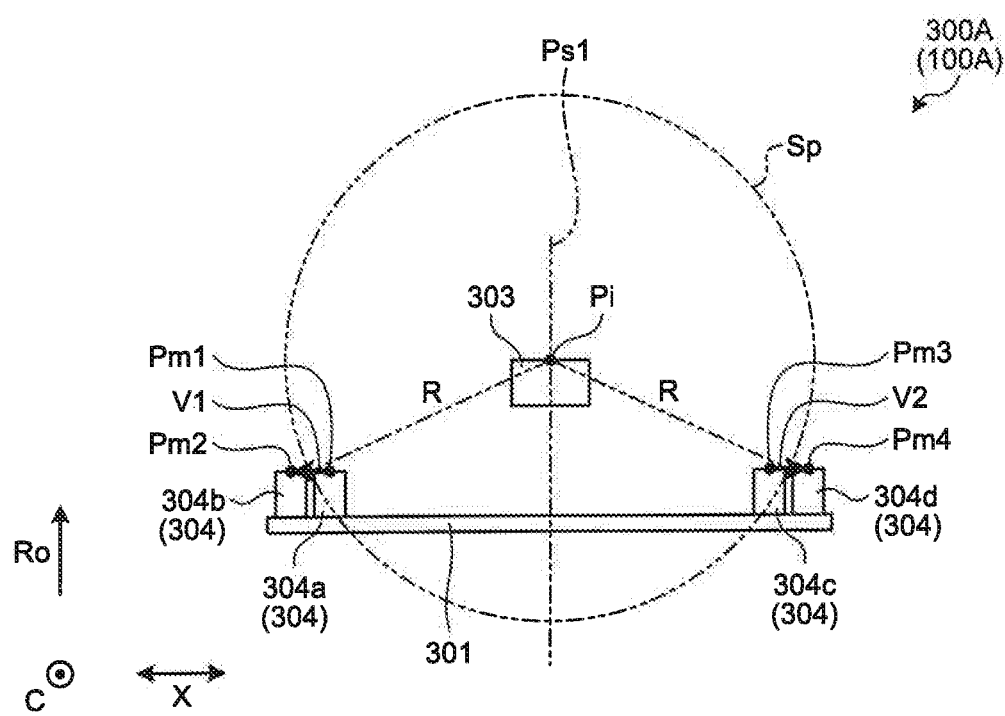
FIG. 11 is a side view schematically illustrating an example of a layout of a hammering position and a microphone position in an acoustic inspection system according to a second embodiment.

FIG. 11 is a side view illustrating an example of the layout of the hammering position Pi and audio-acquisition positions Pm1 to Pm4 in an acoustic inspection system 100A according to a second embodiment. The acoustic inspection system 100A according to the present embodiment is used in place of the acoustic inspection system 100 of FIG. 1, and performs acoustic inspection on the inspection target surface 401 of the inspection target 400 that is identical to that in FIG. 1. In the present embodiment, the audio signal acquisition apparatus 300 is replaced with an audio signal acquisition apparatus 300A.

As illustrated in FIG. 11, in the audio signal acquisition apparatus 300A according to the present embodiment, a pair of the audio-acquisition positions Pm1 and Pm2 (microphones 304a and 304b) and a pair of the audio-acquisition positions Pm3 and Pm4 (microphones 304c and 304d) are arranged at positions that are symmetrical with each other with respect to a virtual reference surface Ps1 passing through the hammering position Pi. More specifically, the audio-signal acquisition position Pm3 is arranged to be symmetrical with the audio-acquisition position Pm1 with respect to the virtual reference surface Ps1, and the audio-signal acquisition position Pm4 is arranged to be symmetrical with the audio-acquisition position Pm2 with respect to the virtual reference surface Ps1. In other words, one pair of the audio-acquisition positions Pm1 and Pm2 (microphones 304a and 304b) is arranged to be away from the hammering position Pi by a distance R in the first direction, and the other pair of the audio-acquisition positions Pm3 and Pm4 (microphones 304c and 304d) is arranged to be away from the hammering position Pi by the distance R in the second direction different from the first direction. Further, in other words, the pair of the audio-acquisition positions Pm1 and Pm2 (microphones 304a and 304b) and the pair of the audio-acquisition positions Pm3 and Pm4 (microphones 304c and 304d) are arranged at positions away from each other on a spherical surface Sp that is centered on the hammering position Pi and has a radius R (this condition is referred to as "arrangement condition 2"). The virtual reference surface Ps1 is an example of a first virtual reference surface. In the example of FIG. 11, one direction along the axial direction is an example of the first direction, and the other direction along the axial direction is an example of the second direction.

As for the hammering position Pi and the audio-acquisition positions Pm1 to Pm4 that satisfy the arrangement condition 2, a vector V1 of a component based on hammering on the hammering position Pi in an acoustic intensity based on audio signals acquired at the audio-acquisition positions Pm1 and Pm2 (hereinafter, "first acoustic intensity") and a vector V2 of a component based on hammering on the hammering position Pi in an acoustic intensity based on audio signals acquired at the audio-acquisition positions Pm3 and Pm4 (hereinafter, "second acoustic intensity") are opposite to each other. Therefore, by adding the first acoustic intensity and the second acoustic intensity to each other, it is possible to cancel out the component based on hammering on the hammering position Pi in the first acoustic intensity and the component based on hammering on the hammering position Pi in the second acoustic intensity. Meanwhile, a component based on the noise is not canceled out in the first acoustic intensity, the second acoustic intensity, and the sum of the first acoustic intensity and the second acoustic intensity. Therefore, an acoustic inspection apparatus 200A according to the present embodiment calculates a noise component based on the sum of the first acoustic intensity and the second acoustic intensity, and reduces the noise component from a physical quantity based on the audio signal of at least one of the four audio-acquisition positions Pm1 to Pm4. The audio-acquisition position Pm3 is an example of a third microphone position, and the audio-acquisition position Pm4 is an example of a fourth microphone position.

Figure 12:
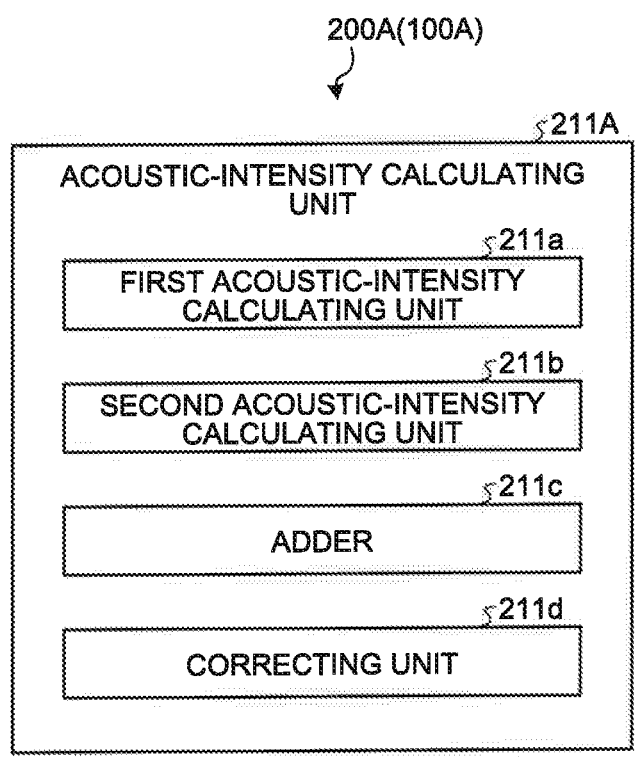
FIG. 12 is a block diagram schematically and exemplarily illustrating an acoustic inspection apparatus according to the second embodiment.

FIG. 12 is a block diagram of an acoustic-intensity calculating unit 211A included in the acoustic inspection apparatus 200A. The acoustic-intensity calculating unit 211A is implemented in place of the acoustic-intensity calculating unit 211 of the acoustic inspection apparatus 200 according to the first embodiment. Except for the acoustic-intensity calculating unit 211A, the configuration of the acoustic inspection apparatus 200A according to the present embodiment is identical to the acoustic inspection apparatus 200 according to the first embodiment.

The acoustic-intensity calculating unit. 211A includes a first acoustic-intensity calculating unit 211a, a second acoustic-intensity calculating unit 211b, an adder 211c, and the correcting unit 211d.

The first acoustic-intensity calculating unit 211a calculates the first acoustic intensity based on the audio signals acquired at the audio-acquisition positions Pm1 and Pm2. The second acoustic-intensity calculating unit 211b calculates the second acoustic intensity based on the audio signals acquired at the audio-acquisition positions Pm3 and Pm4. The adder 211c adds the first acoustic intensity and the second acoustic intensity to each other. The correcting unit 211d sets a frequency component of an output of the adder 211c, that is, the sum of the first acoustic intensity and the second acoustic intensity, which is lower than a threshold (second threshold), to zero. The threshold (second threshold) in this case is set to be larger than the threshold (first threshold) in the first embodiment.

Figure 13:
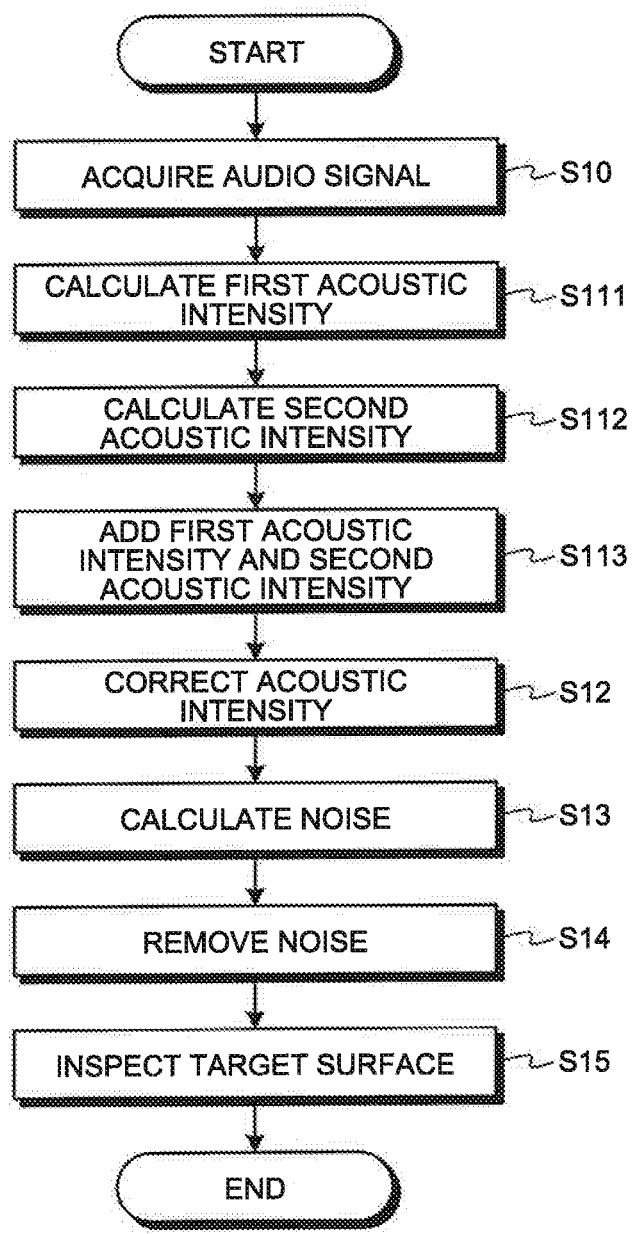
FIG. 13 is a flowchart illustrating an example of a procedure of a series of processes by the acoustic inspection apparatus according to the second embodiment.

FIG. 13 is a flowchart illustrating an example of a procedure of a series of processes by the acoustic inspection apparatus 200A. S10 and S12 to S15 are identical to those in the first embodiment described above. The acoustic-intensity calculating unit 211A acquires audio signals acquired by the microphones 304 via the communicating unit 240 (S10). The first acoustic-intensity calculating unit 211a calculates a first acoustic intensity based on the audio signals acquired by the microphones 304a and 304b (S111). The second acoustic-intensity calculating unit 211b calculates a second acoustic intensity based on the audio signals acquired by the microphones 304c and 304d (S112). The adder 211c adds the first acoustic intensity and the second acoustic intensity to each other (S113). The correcting unit 211d corrects the sum of the first acoustic intensity and the second acoustic intensity (S12). Subsequently, the noise calculating unit 212 calculates a noise component from the corrected acoustic intensity (the sum of the first acoustic intensity and the second acoustic intensity) (S13). The noise removing unit 213 reduces the noise component from a physical quantity based on the audio signal of at least one of the four audio-acquisition positions Pm1, Pm2, Pm3, and Pm4 (S14). The inspecting unit 214 inspects the inspection target surface 401 (the inspection target 400) at the hammering position Pi based on the physical quantity from which the noise has been reduced, by applying a known analysis method (S15).

Figure 14:
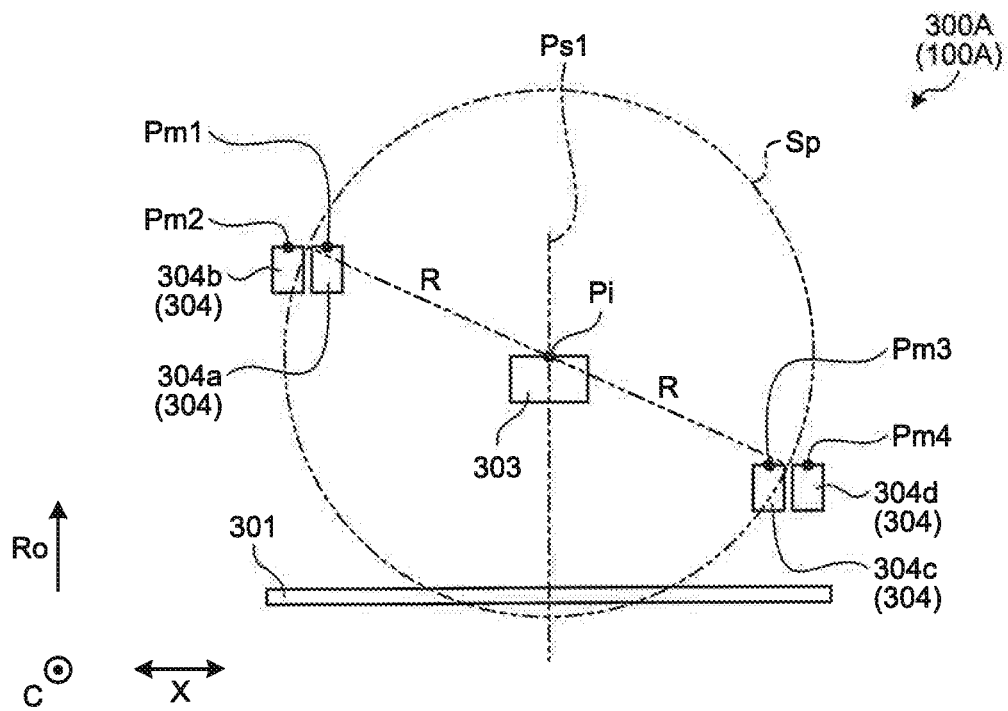
FIG. 14 is a side view schematically illustrating an example of a layout of a hammering position and a microphone position in the acoustic inspection system according to the second embodiment, which is different from that of FIG. 11.
Figure 15:
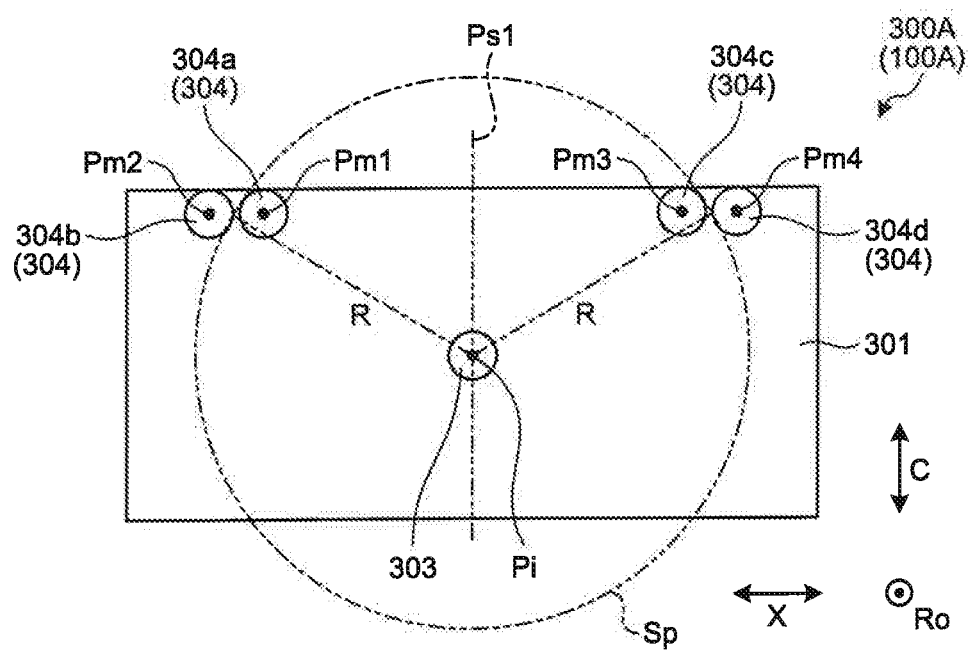
FIG. 15 is a plane view schematically illustrating an example a layout of a hammering position and a microphone position in the acoustic inspection system according to the second embodiment, which is different from those of FIGS. 11 and 14.

FIGS. 14 and 15 are diagrams illustrating modifications of the layout of the hammering position Pi and the audio-acquisition positions Pm1 to Pm4, where FIG. 14 is a side view when these positions are viewed from the circumferential direction (tangential direction), and FIG. 15 is a plane view when these positions are viewed from outside in the radial direction. All the hammering position Pi and the four audio-acquisition positions Pm1 to Pm4 illustrated in FIGS. 11, 14, and 15 satisfy the arrangement condition 2.

In the example of FIG. 11, the pair of the audio-acquisition positions Pm1 and Pm2, the hammering position Pi, and the pair of the audio-acquisition positions Pm3 and Pm4 are arranged along the axial direction. Further, the audio-acquisition positions Pm1 to Pm4 are arranged on a surface of the base 301. The hammering position Pi is arranged to be away from the surface of the base 301.

In the example of FIG. 14, the pair of the audio-acquisition positions Pm1 and Pm2, the hammering position Pi, and the pair of the audio-acquisition positions Pm3 and Pm4 are arranged along a direction obliquely crossing the axial direction when viewed from the circumferential direction (tangential direction). Although not illustrated in the drawings, for example, the pair of the audio-acquisition positions Pm1 and Pm2, the hammering position Pi, and the pair of the audio-acquisition positions Pm3 and Pm4 are shifted from one another in the circumferential direction; however, these positions are not limited thereto.

In the example of FIG. 15, the pair of the audio-acquisition positions Pm1 and Pm2 and the pair of the audio-acquisition positions Pm3 and Pm4 are arranged along the axial direction when viewed from the outside in the radial direction. The pair of the audio-acquisition positions Pm1 and Pm2 and the pair of the audio-acquisition positions Pm3 and Pm4 are shifted from the hammering position Pi in the circumferential direction. Although not illustrated in the drawings, for example, the audio-acquisition positions Pm1 to Pm4 are arranged on the surface of the base 301 and the hammering position Pi is away from the surface of the base 301; however, these positions are not limited thereto. It suffices that the arrangement of the hammering position Pi and the four audio-acquisition positions Pm1 to Pm4 satisfies the arrangement condition 2 described above, and the arrangement is no, limited to those in the examples of FIGS. 11, 14, and 15, and can be set in various ways.

As described above, according to the present embodiment, the acoustic inspection apparatus 200A uses the fact that a component generated by hammering on the hammering position Pi is canceled out in the sum of a first acoustic intensity based on audio signals acquired at the two audio-acquisition positions Pm1 and Pm2 (the first microphone position and the second microphone position) and a second acoustic intensity based on audio signals acquired at the two audio-acquisition positions Pm3 and Pm4 (the third microphone position and the fourth microphone position), and calculates a noise component from the sum of the first acoustic intensity and the second acoustic intensity and reduces the noise component from a physical quantity based on the audio signal of at least one of the four audio-acquisition positions Pm1 to Pm4.

Therefore, according to the present embodiment, it is possible to reduce the influence of noise in the inspection by analyzing the sound generated by hammering, for example, so that the accuracy of the inspection can be further improved.

Third Embodiment

Figure 16:
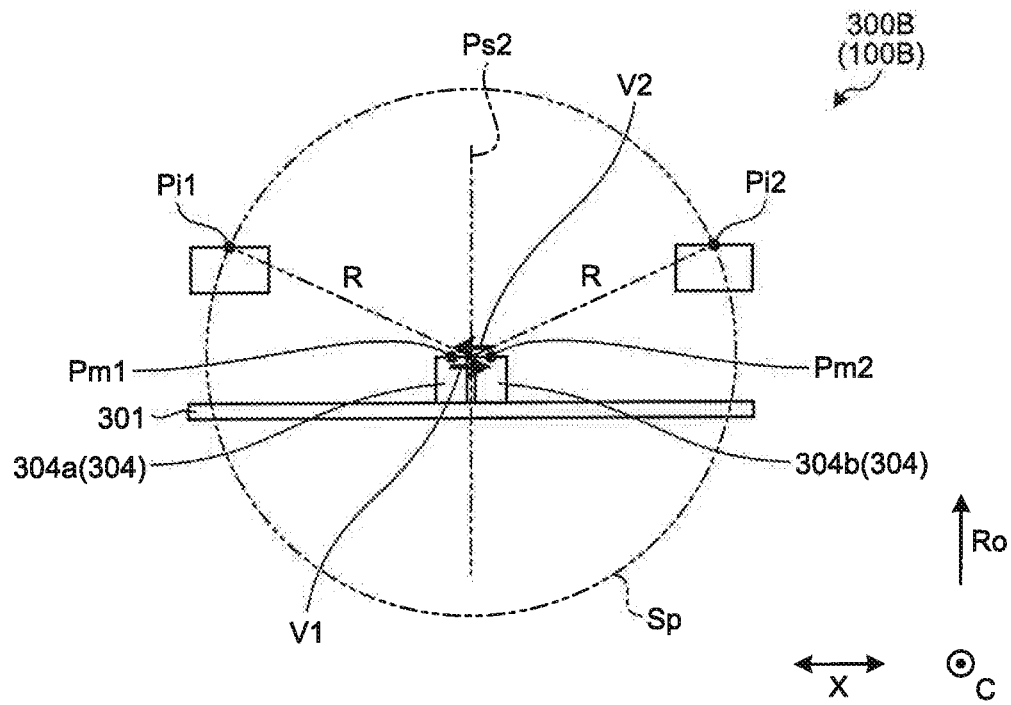
FIG. 16 is a side view schematically illustrating an example of a layout of a hammering position and a microphone position in an acoustic inspection system according to a third embodiment.

FIG. 16 is a side view illustrating an example of the layout of hammering positions Pi1 and Pi2 and the audio-acquisition positions Pm1 and Pm2 in an acoustic inspection system 100B according to a third embodiment. The acoustic inspection system 100B according to the present embodiment is used in place of the acoustic inspection system 100 of FIG. 1 and performs acoustic inspection on the inspection target surface 401 of the inspection target 400 that is identical to that in FIG. 1. In the present embodiment, the audio signal acquisition apparatus 300 is replaced with an audio signal acquisition apparatus 300B.

As illustrated in FIG. 16, in the audio signal acquisition apparatus 300B according to the present embodiment, the hammering positions Pi1 and Pi2 are arranged at positions that are symmetrical with each other with respect to a virtual reference surface Ps2 passing through a midpoint (the center of gravity) between the audio-acquisition positions Pm1 and Pm2. In other words, the hammering position Pi1 is arranged to be away from the midpoint between the audio-acquisition positions Pm1 and Pm2 by a distance R in the first direction, and the other hammering position Pi2 is arranged to be away from the midpoint between the audio-acquisition positions Pm1 and Pm2 by the distance R in the second direction different from the first direction. Further, in other words, the hammering positions Pi1 and Pi2 are arranged at positions away from each other on a spherical surface Sp that is centered on the midpoint between the audio-acquisition positions Pm1 and Pm2 and has a radius R (this condition is referred to as "arrangement condition 3"). The virtual reference surface Ps2 is an example of a second virtual reference surface. In the example of FIG. 16, one direction along the axial direction is an example of the first direction, and the other direction along the axial direction is an example of the second direction.

As for the hammering positions Pi1 and Pi2 and the audio-acquisition positions Pm1 and Pm2 that satisfy the arrangement condition 3, a vector V1 of a component based on hammering on the hammering position Pi1 in an acoustic intensity based on audio signals acquired at the audio-acquisition positions Pm1 and Pm2 in a case of hammering on the hammering position Pi1 (hereinafter, "first acoustic intensity") and a vector V2 of a component based on hammering on the hammering position Pi2 in an acoustic intensity based on audio signals acquired at the audio-acquisition positions Pm1 and Pm2 in a case of hammering on the hammering position Pi2 (hereinafter, "second acoustic intensity") are opposite to each other. Therefore, also in the present embodiment, by adding the first acoustic intensity and the second acoustic intensity to each other as in the second embodiment, it is possible to cancel out the component based on hammering on the hammering position Pi1 and the component based on hammering on the hammering position Pi2. Further, a component based on the noise is not canceled out in the first acoustic intensity, the second acoustic intensity, and the sum of the first acoustic intensity and the second acoustic intensity. Therefore, an acoustic inspection apparatus 200B according to the present embodiment calculates a noise component based on the sum of the first acoustic intensity and the second acoustic intensity, and reduces the noise component from a physical quantity based on the audio signal of at least one of the two audio-acquisition positions Pm1 and Pm2. The hammering position Pi1 is an example of a first hammering position, and the hammering position Pi2 is an example of a second hammering position.

The acoustic inspection apparatus 200B according to the present embodiment includes the acoustic-intensity calculating unit 211A that is identical to that in the second embodiment, and can perform processing in accordance with a procedure identical to that illustrated in FIG. 13 by the acoustic-intensity calculating unit 211A. The arrangement of the hammering positions Pi1 and Pi2 and the audio-acquisition positions Pm1 and Pm2 can be set in various ways so as to satisfy the arrangement condition 3 described above.

As described above, according to the present embodiment, the acoustic inspection apparatus 200B uses the fact that components generated by hammering on the hammering positions Pi1 and Pi2 are canceled out in the sum of the first acoustic intensity based on audio signals generated by hammering on the hammering position Pi1 (first hammering position) acquired at the two audio-acquisition positions Pm1 and Pm2 (microphone positions) and the second acoustic intensity based on audio signals generated by hammering on the hammering position Pi2 (second hammering position) acquired at the two audio-acquisition positions Pm1 and Pm2, and calculates a noise component from the sun of the first acoustic intensity and the second acoustic intensity and reduces the noise component from a physical quantity based on the audio signal of at least one of the two audio-acquisition positions Pm1 and Pm2. Therefore, according to the present embodiment, for example, it is possible to reduce the influence of noise in the inspection by analyzing the sound generated by hammering, so that the accuracy of the inspection can be further improved.

Modification of Audio Signal Acquisition Apparatus

Figure 17:
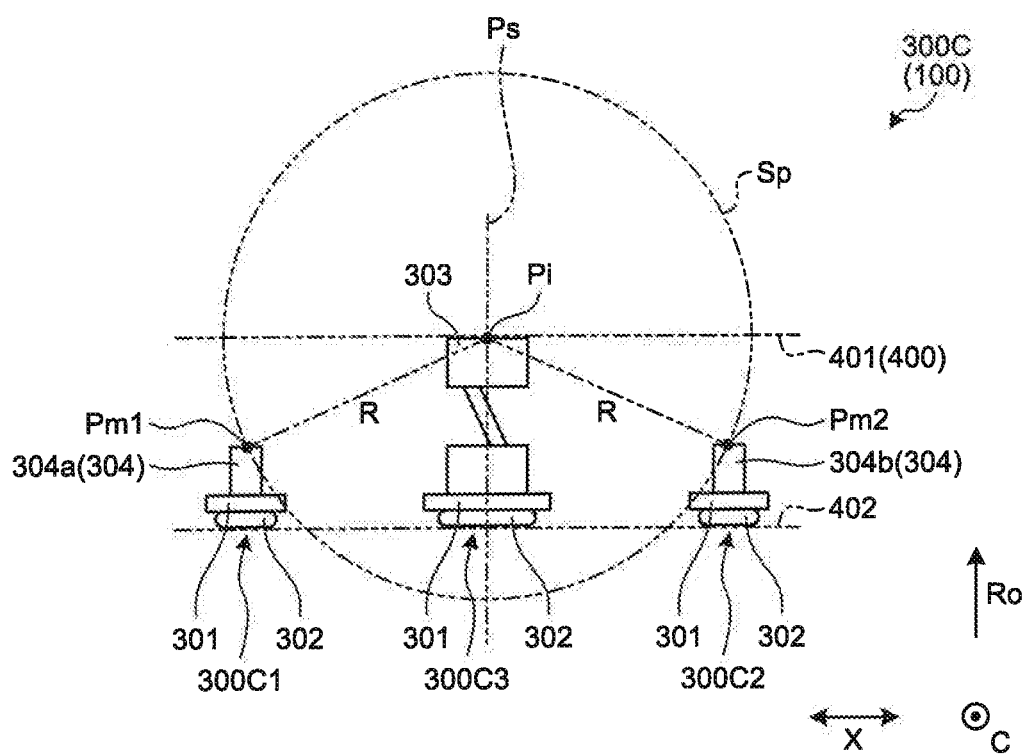
FIG. 17 is a side view schematically and exemplarily illustrating a modification of the apparatus configuration in the acoustic inspection system according to the first embodiment.

FIG. 17 is a side view illustrating a modification of the apparatus configuration in the acoustic inspection system 100 according to the first embodiment (an audio signal acquisition apparatus 300C). In the present modification, the audio signal acquisition apparatus 300C includes an audio acquisition apparatus 300C1 including the microphone 304a, an audio acquisition apparatus 300C2 including the microphone 304b, and a hammering apparatus 300C3 having the hammering mechanism 303. The acoustic inspection apparatus 200 controls the audio acquisition apparatuses 30001 and 300C2 and the moving mechanism 302 of the hammering apparatus 300C3 so that the audio-acquisition positions Pm1 and Pm2 and the hammering position Pi satisfy the arrangement condition 1 described above. Due to this configuration, it is also possible to obtain effects identical to those in the first embodiment described above. Further, according to the present modification, the audio signal acquisition apparatus 3000C can be configured to be more compact, and thus the audio signal acquisition apparatus 300C has an advantage such that, for example, it can be used even in a narrower gap G.

Further, specifications of respective configurations, shapes, and the like (structure, type, direction, shape, dimension, length, width, thickness, height, number, arrangement, position, material, and the like) can be changed as appropriate and carried out. For example, the configurations and methods described in the above embodiments are applicable to various inspection targets in an environment in which the noise is propagated from one direction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An acoustic inspection system comprising:
   an audio signal acquisition apparatus comprising:
   a hammering mechanism that generates audio signals by hammering on an inspection target at a hammering position; and
   microphones that acquire the audio signals at respective microphone positions; and
   an acoustic inspection apparatus comprising:
   an acoustic-intensity calculating unit that calculates an acoustic intensity of the audio signals, in which an acoustic intensity caused by hammering on the inspection target at the hammering position is canceled out
   in an arrangement in which at least one pair of microphone positions are symmetrical with each other with respect to the hammering position and a vector of an audio signal from the hammering position toward one of the pair of microphone positions and a vector of an audio signal from the hammering position toward another of the pair of microphone positions are components of opposite directions to each other, or
   in an arrangement in which two hammering positions are symmetrical with each other with respect to a midpoint between a pair of microphone positions and a vector of an audio signal based on hammering on one of the two hammering positions and a vector of an audio signal based on hammering on another of the two hammering positions are components of opposite directions to each other;
   a noise calculating unit that calculates a noise component from the acoustic intensity calculated by the acoustic-intensity calculating unit;
   a noise removing unit that removes the noise component from a physical quantity based on at least one of the audio signals acquired at the pair of microphone positions; and
   an inspecting unit that performs inspection on the inspection target based on the physical quantity from which the noise component has been removed.

2. The acoustic inspection system according to claim 1, wherein
   the acoustic-intensity calculating unit includes
   a first acoustic-intensity calculating unit that calculates a first acoustic intensity of a first audio signal and a second audio signal, the first audio signal being generated by hammering on the hammering position and acquired at a first microphone position that is away from the hammering position, the second audio signal being generated by hammering on the hammering position and acquired at a second microphone position that is away from the hammering position and is different from the first microphone position,
   a second acoustic-intensity calculating unit that calculates a second acoustic intensity of a third audio signal and a fourth audio signal, the third audio signal being generated by hammering on the hammering position and acquired at a third microphone position that is symmetrical with the first microphone position with respect to a first virtual reference surface including the hammering position, the fourth audio signal being generated by hammering on the hammering position and acquired at a fourth microphone position that is symmetrical with the second microphone position with respect to the first virtual reference surface, and
   an adder that calculates a sum of the first acoustic intensity and the second acoustic intensity, and
   the noise calculating unit calculates the noise component from the sum.

3. The acoustic inspection system according to claim 1, wherein
the acoustic-intensity calculating unit includes
a first acoustic-intensity calculating unit that calculates a first acoustic intensity of a first audio signal and a second audio signal, the first audio signal being generated by hammering on a first hammering position and acquired at a first microphone position that is away from the first hammering position, the second audio signal being generated by hammering on the first hammering position and acquired at a second microphone position that is away from the first hammering position and is different from the first microphone position,
a second acoustic-intensity calculating unit that calculates a second acoustic intensity of a third audio signal and a fourth audio signal, the third audio signal being acquired at the first microphone position and generated by hammering on a second hammering position that is symmetrical with the first hammering position with respect to a second virtual reference surface with respect to which the first microphone position and the second microphone position are symmetrical with each other, the fourth audio signal being acquired at the second microphone position and generated by hammering on the second hammering position, and
an adder that calculates a sum of the first acoustic intensity and the second acoustic intensity, and
the noise calculating unit calculates the noise component from the sum.

4. The acoustic inspection system according to claim 1, wherein the acoustic-intensity calculating unit includes a correcting unit that sets a frequency component lower than a threshold to zero.

5. The acoustic inspection system according to claim 1, further comprising a moving mechanism that is capable of moving at least either one of the microphones or the hammering mechanism along the inspection target.

6. An acoustic inspection method causing an acoustic inspection apparatus configured as a computer to perform:
hammering on an inspection target at a hammering position to generate audio signals;
acquiring, by microphones, the audio signals at respective microphone positions;
calculating an acoustic intensity of the audio signals in which an acoustic intensity caused by hammering on the inspection target at the hammering position is canceled out
in an arrangement in which at least one pair of microphone positions are symmetrical with each other with respect to the hammering position and a vector of an audio signal from the hammering position toward one of the pair of microphone positions and a vector of an audio signal from the hammering position toward another of the pair of microphone positions are components of opposite directions to each other, or
in an arrangement in which two hammering positions are symmetrical with each other with respect to a midpoint between a pair of microphone positions and a vector of an audio signal based on hammering on one of the two hammering positions and a vector of an audio signal based on hammering on another of the two hammering positions are components of opposite directions to each other;
calculating a noise component from the calculated acoustic intensity;
removing the noise component from a physical quantity based on at least one of the audio signals acquired at the pair of microphone positions; and
performing inspection on the inspection target based on the physical quantity from which the noise component has been removed.

\* \* \* \* \*